Patented Sept. 13, 1949

2,481,687

UNITED STATES PATENT OFFICE 2,481,687

HOT MELT COATING COMPOSITION

Martin Salo and Harold F. Vivian, Rochester, N. Y., assignors to Eastman Kodak Company, Rochester, N. Y., a corporation of New Jersey No Drawing. Application March 30, 1946, Serial No. 658,589

7 Claims. (Cl. 106—181)

This invention relates to hot melt-coating compositions essentially consisting of high butyryl cellulose esters and chlorinated diaryls and products having thereon hot melt coatings of that composition. Ordinarily in forming protective coatings the protective material is coated out onto the surface of the support from its solution in a liquid solvent, and the solvent is evaporated therefrom. This procedure involves the handling of volatile material and the presence of vapors and the necessity of curing the adhesive coatings.

One of the objects of our invention is to provide a composition which is useful for hot melt-coating purposes. Another object of our invention is to provide a hot melt-coating composition which, when coated upon a support, has adhesive properties making the resulting product useful for the preparation of laminated materials. A further object of our invention is to provide a hot melt-coating composition which, when coated out upon a surface, gives protective coatings having good abrasion resistance and free of exudation. A still further object of our invention is to provide a hot melt-coating composition in which may be incorporated a small proportion of wax, such as paraffin, thus increasing the water-vapor resistance of the coating. A still further object of our invention is to provide a composition useful in cast-molding. Other objects of our invention will appear herein.

We have found that compositions of particular butyric acid esters of cellulose with certain proportions of chlorinated diaryls such as chlorinated diphenyls having a chlorine content above 40% are useful such as for example for hot melt-coating purposes. We have found that compositions within certain limits are susceptible to being worked by melting those compositions and flowing out onto a smooth surface thereby forming a thin layer of a coating upon that surface as described herein. We have also found that these compositions may be melted and poured into a mold to form cast-molded products. Our composition consists of a butyric acid ester of cellulose having a high butyryl content and a chlorinated diaryl generally but not always with some plasticizer. For melt-coating or cast-molding operations it is necessary that compositions in accordance with our invention contain cellulose esters having a high butyryl content.

The compositions which are described herein may be employed for coating the surface of paper, cloth, metal, or the like, merely by subjecting the composition to an elevated temperature which will melt the composition and depositing the composition while in molten condition as a thin layer upon the surface to be coated. The thus-applied coating almost immediately sets upon cooling by the air or by cooling rolls so that it may be readily handled. The characteristics set out herein, however, are obtained in compositions which are specifically limited as to the type of cellulose ester and the material which is mixed therewith, the presence of both high butyryl cellulose esters and chlorinated diaryls being essential to the obtaining of compositions which are adapted to be used in a hot melt-coating process and which will give coatings having desirable properties. In addition to the cellulose ester and the chlorinated diaryl, a small amount of plasticizer is usually desirable in the composition. Also, for moisture vapor-proof types of coatings or where an ultra-smooth surface is desired, it is desirable to incorporate a small amount of wax in the composition.

The cellulose esters which form one of the constituents of the compositions in accordance with our invention are cellulose esters having a butyryl content of at least 47% and which have been hydrolyzed not more than a small extent. For instance, it is preferred that the esters have been given at least a slight hydrolysis to increase their heat stability, but as a rule, the cellulose esters should have no more than two hydroxyl groups per twenty-four cellulose carbon atoms. If the cellulose ester is substantially a tri-ester, it is necessary that it be a stable compound. The cellulose esters which have been found to be most suitable in our invention are those having at least 45% butyryl, the remainder of the acyl being acetyl. Ordinarily, the presence of no more than 5% acetyl is desired. If any other acyls than butyryl are present, it is desirable that they only be present in a sufficiently small amount that they do not influence the character of the cellulose ester. The cellulose ester may be a cellulose butyrate, a cellulose acetate butyrate, a cellulose propionate butyrate, or a cellulose acetate propionate butyrate, or perhaps even a few percent of some acyl groups higher than butyryl may be present, providing those groups are not present in an amount sufficient to substantially influence the character of the cellulose ester. The butyric acid esters of cellulose which are suitable for forming the compositions in accordance with our invention take in but a very small proportion of the field of butyric acid esters of cellulose. In the main, the cellulose esters useful in our invention will be those of the fatty acids of not more than four carbon atoms, which esters will be referred to herein as lower fatty acid esters of cellulose.

The butyric acid esters of cellulose which are suitable for use in the compositions of our invention are still further restricted to various other characteristics. The butyric acid esters which are useful for our compositions must have a melting point of less than 200° C., and a fundamental cuprammonium viscosity of not more than 10 centipoises, and preferably not more than 5 centipoises. The esters which are suitable for use in melt-coating compositions in accordance with our invention have an acetone viscosity within the range of 5–200 centipoises, this being the viscosity of one part of cellulose ester dissolved in 9 parts of acetone at a temperature of 25° C.

The chlorinated diaryls which are useful in the compositions of our invention are those having a chlorine content above 40%. The chlorinated diphenyls, sold under the trade name Aroclors, have been found to be particularly useful for use in our compositions, although the chlorinated naphthalenes and their homologues and the chlorinated dibenzyls are also useful in our compositions. The preparation and properties of the chlorinated diphenyls or Aroclors are described in an article by Penning in Industrial and Engineering Chemistry, vol. 22, page 1180, November 1930. Some of the Aroclors which have a chlorine content above 40% and have been found to be particularly useful in compositions in accordance with our invention are those identified by the following numbers: 1262, 1270, 1268, 4465, 5442, 5460, and 2565. Some of these Aroclors are characterized by a fairly low melting point, whereas other of these Aroclors are characterized by a higher melting point; the Aroclors which are suitable for use in compositions in accordance with our invention may be divided into the low melting Aroclors as represented by 4465 and 5442 and the high melting Aroclors as exemplified by Aroclors, Nos. 1268, 1270, and 5460. The compositions in accordance with our invention in which the low melting Aroclors are used give coatings which are adhesive at a lower temperature range than the compositions in which the higher melting Aroclors are used. For instance, for compositions to be employed for mounting tissue which are adhesive at temperatures within the range of 180–250° F., the low melting Aroclors are useful. The higher melting Aroclors on the other hand are useful for forming coatings which are adhesive at a higher temperature range, such as from 250 to 350° F., and are useful in making laminated products wherein heat and high pressures are employed.

The plasticizers which may be employed in compositions in accordance with our invention are the common types of plasticizers which are resistant to the effects of elevated temperature. These plasticizers are characterized by a flash point greater than 170° C. For instance, the phthalates of alcohols of at least five carbon atoms are useful in hot melt compositions in accordance with our invention because these plasticizers are not volatile at the melt-coating temperatures used. Another set of plasticizers which are useful are the sebacates, particularly those of butyl alcohol, or alcohols higher than butyl. Also suitable for use as plasticizers are the stearates of alkoxy alkyl alcohols, such, for instance, as methoxyethyl stearate and butoxyethyl stearate. Other plasticizers suitable for use are Hercolyn or Abalyn, these plasticizers used with high butyryl cellulose esters being described in U. S. Patent No. 2,439,093 of L. W. A. Meyer, Castor oil, etc. If desired, a mixture of one or more of these plasticizers with butyl stearate may be employed, such as disclosed in our U. S. Patents Nos. 2,387,773, and 2,387,774. Also, there may be incorporated in the compositions, if desired, up to 10% of wax, such as paraffin, beeswax, carnauba, or the like. This addition, particularly useful in the case of the higher melting Aroclors, helps the vapor resistance of the resulting coating and also aids in obtaining a smooth coating upon the surface to which the melt coating is applied. In addition, stearyl alcohol or cetyl alcohol may be incorporated in the composition, if the object is the preparation of a water-proof melt-coating composition.

If the purpose of the melt coating is to apply an adhesive coating to a surface, the composition in accordance with our invention may contain as little as 10% of the high butyryl cellulose ester. If, on the other hand, coatings are desired primarily for protective coatings having good abrasion resistant properties, it is desirable to have the high butyryl cellulose ester in an amount at least 50% of the composition. It is necessary that the cellulose ester be not more than 80% of the composition in any case. The useful range of proportions for chlorinated diaryls in compositions in accordance with our invention is 10 to 80%. However, in most cases a proportion within the range of 10 to 30% is sufficient. However, with adhesive coatings of low melting characteristics or in processes for impregnating paper, it has been found to be often desirable to use considerably more of a chlorinated diaryl than 30%. The amount of plasticizer employed, if used, should be within the range of 3 to 40%, depending upon the proportion of Aroclors which is present. If less than 3% of plasticizer is used it will have little or no effect and may as well be omitted. The Aroclor acts in a similar manner to plasticizer as far as contributing to the melting characteristics of the composition is concerned. However, plasticizer is more effective in reducing the viscosity of the melt and, therefore, it is preferred but not always necessary that some plasticizer be used rather than the chlorinated diaryl only with the cellulose ester. The various constituents of our compositions should be so combined as a rule that the viscosity of the composition at 170° C. is less than 100,000 centipoises, as ordinarily high-speed coating is desirable; compositions having a viscosity below 30,000 centipoises at 170° C. are preferable.

The specific examples given herein illustrate various formulas under the terms of our invention which are useful for various purposes.

The melt coatings of our composition are useful for various purposes. For instance, some of these compositions are useful for coating onto aluminum foil, which coatings may be employed to cause paper or cloth to adhere thereto by heat and pressure thus forming a composite wrapping material. Some compositions in accordance with our invention are useful for causing the adherence of glass to steel. Some coatings are useful merely as coatings because of their abrasion resistance or because of their moisture vapor-proofing properties, or both. Some compositions in accordance with our invention are useful as water-proof coatings on cellulose board, such as Masonite, to give the cellulose board a smooth, appealing surface, and make that board useful for situations where contact with water or aqueous liquid is met with. Some compositions in accordance with our invention are useful for the formation of laminated products, such as laminated papers or fabrics. This is accomplished by melt-coating the paper or fabric with our composition and then subjecting a number of sheets contacting each other to pressure and temperature; for instance, a pressure of 250 pounds per square inch and a temperature of 250–300° F.

The number of sheets used for making the lamination is governed by the thickness of the sheets and the thickness desired in the final product. This lamination may, for instance, use 20 or 25 sheets, for example, compressed together by means of heat and pressure.

The compositions in accordance with our invention may be obtained by mixing the cellulose esters in comminuted form into the Aroclor, preferably with plasticizer at a temperature of about 150–170° C. It is preferred that the cellulose ester be finely divided, such as may be obtained by ball-milling operation, to aid mixing of the cellulose ester and the Aroclor with or without plasticizer. Stirring is desirable in the formation of composition. One procedure by which our composition may be made and used for melt coating is to intimately mix the cellulose ester with the other ingredients, followed by passing the resulting composition between heated rolls thereby causing a softening or melting together of ingredients. After forming the sheet or film, it may then be broken up into small granules, which granules may be conveniently stored. For use in coating, the granules are melted in a heated extrusion apparatus or heated mixing equipment of suitable design and fed into a melt-coating machine, particularly one which operates in a continuous manner. In this way the composition is not kept in a melted condition for a very long period of time prior to coating, and it is, therefore, unnecessary to store large quantities of composition in a molten condition.

Compositions in accordance with our invention may be melt coated onto materials, such as paper, cloth, foil, or the like using apparatus, such as described in patents of B. C. Miller and John Waldron Corporation, U. S. Patents Nos. 2,070,563, 2,117,199, 2,117,200, 2,189,758, 2,190,843, and 2,214,787. These machines can be adapted to squeeze roll coating by passing the cellulose web, either paper or cloth, between the two coating rolls. With the squeeze-roll method it is possible to coat both sides of the web simultaneously, if the melt is provided for the top of the paper by a suitable hopper on the top roll and to the bottom roll by the regular hopper described.

The cellulose esters which are employed in preparing our compositions are prepared by reacting upon cellulose with butyric anhydride, preferably after a pre-soaking or pre-treatment with a small amount of acetic acid. For instance, by means of a pretreatment, such as described and claimed in Malm Patents Nos. 2,342,415 and 2,342,416, the cellulose is activated using only a small proportion of acetic acid. Esterification of this pretreated cellulose with butyric anhydride and catalyst, such as by the method described and claimed in Blanchard Patent No. 2,304,792, or Malm Patents Nos. 2,362,576 and 2,345,406, results in a high butyryl cellulose ester. The ester may then be hydrolyzed, preferably only for a sufficient time to reduce the sulfur content of the ester.

The cellulose ester which we prefer to use in compositions in accordance with our invention are those which have been stabilized. A method of stabilizing cellulose esters suitable for use here is described and claimed in Malm and Kirton Patent No. 2,250,201. The esters after stabilizing in accordance with this process have a char point of at least 260° and usually approximately 300° or more, and a melting point considerably below its char point. Compositions in accordance with our invention in which these esters are used may be subjected to melting temperatures for the time necessary to perform coating operations without detrimentally affecting the coating composition. If desired, however, to further increase the resistance of the composition to the effect of heat, a small proportion, such as 1% of an anti-oxidant, such as hydroquinone may also be incorporated in the compositions in accordance with our invention.

One of the uses to which cellulose webs hot melt coated by high butyryl cellulose ester-chlorinated diaryl as described herein may be put is in the formation of plywood. Thin layers of wood may be layered with melt-coated cellulose webs as described in the number of layers desired, and the sandwiched material then be subjected to heats and pressures as described herein to form a firm moisture-resistant bond between the sheets of wood.

The following examples illustrate use of compositions in accordance with our invention:

*Example 1.*—A composition was prepared consisting of 59 parts of cellulose acetate butyrate having a butyryl content of 47.6%, and acetyl content of 6%, and a viscosity of 33 centipoises, 25° C. in a 10% solution in acetone, 31 parts of Aroclor No. 5460, 10 parts of octyl phthalate and one part of paraffin. This composition was employed in a melt-coating operation for coating both sides of a high $\alpha$-cellulose paper. The product obtained contained a coating having good abrasion resistance and a fairly high resistance to a passage of water-vapor therethrough.

*Example 2.*—A composition was prepared consisting of 80 parts of Aroclor No. 4465, 15 parts of cellulose acetate butyrate having a butyryl content of 48% and 5 parts of amyl phthalate. A layer of this composition was applied by melt coating to aluminum foil. The resulting product was suitable for adhering paper or cloth thereto by means of heat and pressure.

*Example 3.*—A composition was prepared consisting of 70 parts of Aroclor No. 4465, 20 parts of cellulose acetate butyrate having a butyryl content of approximately 50% and 10 parts of amyl phthalate. This composition was coated on the surface of a steel sheet and was found to be useful for causing glass to adhere thereto.

*Example 4.*—A composition was prepared consisting of 50 parts of Aroclor No. 4465, 40 parts of cellulose acetate butyrate having a butyryl content of approximately 48% and 10 parts of octyl phthalate. This composition was melt coated onto thin paper. The resulting product which was a mounting tissue was found to be as good as standard mounting tissue for mounting photographs within the usual temperature range of 185–250° F.

*Example 5.*—A composition was prepared consisting of 9.9 pounds of a heat stable cellulose acetate butyrate having a butyryl content of approximately 48%, 6.3 pounds of Aroclor No. 5460, 1.25 pounds of dibutyl sebacate, and .54 pound of n-octadecyl alcohol. This composition was employed for melt coating a high alpha-cellulose grade photographic paper so that there resides thereon a waterproof coating. This paper was then coated using photographic emulsion, and the coating prevented bleeding of the sensitizing dyes from the emulsion into the paper. This photographic paper was useful in quick development work, such as where the finished photographic product is desired very shortly after exposure of the emulsion. This paper is susceptible to treatment with developing and fixing solutions and washing operations and is capable of always immediately drying, due to the protection of the paper from wetting by means of the protective coating.

*Example 6.*—A hot melt-coating composition was prepared consisting of 80 parts of Aroclor No. 5460 and 10 parts of cellulose acetate butyrate having a cutyryl content of approximately 50%. This composition was used in a process of impregnating paper in which paper was run through a hot melt-coating machine in which the cellulose ester-Aroclor composition was applied as a hot melt coating, and the paper was then run through calender rolls and squeezed at high pressure after the coating to drive the coating material into the paper. The paper resulting from melt coating with the composition described herein and having a photographic emulsion thereon is useful for photographic copying paper.

The paper when impregnated with compositions in accordance with our invention is translucent, and the resulting paper may be used in any connection where translucency is desired. Instead of using Aroclor No. 5460, Aroclor No. 1268 was used in the same way. The resulting composition was found suitable for impregnating paper as described.

Although the compositions in accordance with our invention are regarded primarily as useful for hot melt-coating compositions, we have also found that these compositions are of value in cast molding operations. For instance, the composition is melted and poured into the mold and after some cooling may be removed from the mold and is in suitable form. In compositions of this type it is often desirable to include a small proportion of wax which contributes to the smoothness of the finish on the melt object and also facilitates the removal of the molded object from the mold in which it has been formed. If desired, the cast molded object may be further finished by polishing operations if the finish is not as smooth and regular as desired.

Compositions for cast molding in which opal wax is employed with a high butyryl cellulose ester is not our invention but is the invention of Gordon D. Hiatt and Helen N. Jarvis.

We claim:

1. A composition of matter adapted for use in melt-coating operations having a viscosity of less than 100,000 cps. at 170° C. essentially consisting of 10–80% of a heat stable lower alkanoate ester of cellulose having a butyryl content of at least 45%, not more than two hydroxyls per 24 cellulose carbon atoms, and an acetone viscosity of 5–200 centipoises, 0–40% of a heat resistant organic acid ester of an aliphatic alcohol, which ester contains only C, H, and O and has a molecular carbon content of 18–24 carbon atoms and a molecular weight of 306–392 and 10–80% of a chlorinated diphenyl having a chlorine content of more than 40%.

2. A composition of matter adapted for use in melt-coating operations having a viscosity of less than 100,000 cps. at 170° C., essentially consisting of 10–80% of a heat stable cellulose acetate-butyrate having a butyryl content of at least 45%, no more than two hydroxyls per 24 cellulose carbon atoms, and an acetone viscosity of 5–200 centipoises, 0–40% of a heat resistant organic acid ester of an aliphatic alcohol, which ester contains only C, H, and O and has a molecular carbon content of 18–24 carbon atoms and a molecular weight of 306–392 and 10–80% of a chlorinated diphenyl having a chlorine content of more than 40%.

3. A composition of matter adapted for use in melt-coating operations having a viscosity of less than 100,000 cps. at 170° C., essentially consisting of 10–80% of a heat stable cellulose acetate-butyrate having a butyryl content of at least 45%, no more than two hydroxyls per 24 cellulose carbon atoms, and an acetone viscosity of 5–200 centipoises, 0–40% of dioctyl phthalate and 10–80% of a chlorinated diphenyl having a chlorine content of more than 40%.

4. A composition of matter adapted for use in melt-coating operations having a viscosity of less than 100,000 cps. at 170° C., essentially consisting of 10–80% of a heat stable cellulose acetate-butyrate having a butyryl content of at least 45%, no more than two hydroxyls per 24 cellulose carbon atoms, and an acetone viscosity of 5–200 centipoises, 0–40% of diamyl phthalate and 10–80% of a chlorinated diphenyl having a chlorine content of more than 40%.

5. A composition of matter adapted for use in melt-coating operations having a viscosity of less than 100,000 cps. at 170° C., essentially consisting of 10–80% of a heat stable cellulose acetate-butyrate having a butyryl content of at least 45%, no more than two hydroxyls per 24 cellulose carbon atoms, and an acetone viscosity of 5–200 centipoises, 0–40% of dibutyl sebacate and 10–80% of a chlorinated diphenyl having a chlorine content of more than 40%.

6. A composition adapted for use in hot melt-coating operations essentially consisting of 59 parts of a heat stable cellulose acetate butyrate having a butyryl content of approximately 48%, 31 parts of a chlorinated diphenyl having a chlorine content above 40%, 10 parts of dioctyl phthalate and 1 part of a wax.

7. A composition of matter adapted for use in melt-coating operations having a viscosity of less than 100,000 cps. at 170° C. essentially consisting of 10–80% of a heat stable mixed lower alkanoate-butyric acid ester of cellulose having a butyryl content of at least 45%, not more than two hydroxyls per 24 cellulose carbon atoms, and an acetone viscosity of 5–200 centipoises, 0–40% of a heat resistant organic acid ester of an aliphatic alcohol, which ester contains only C, H, and O and has a molecular carbon content of 18–24 carbon atoms and a molecular weight of 306–392, 10–80% of a chlorinated diphenyl having a chlorine content of more than 40%, and a wax in an amount not more than 10%.

MARTIN SALO.
HAROLD F. VIVIAN.

REFERENCES CITED

The following references are of record in the file of this patent:

UNITED STATES PATENTS

| Number | Name | Date |
| --- | --- | --- |
| 1,710,078 | Schwartz | Apr. 23, 1929 |
| 1,896,581 | Hagedorn | Feb. 7, 1933 |
| 1,907,521 | Dreyfus | May 9, 1933 |
| 2,170,416 | Klinger | Aug. 27, 1939 |
| 2,336,531 | Conklin | Dec. 14, 1943 |

OTHER REFERENCES

"Hercose C," Hercules Powder Co., Wilmington, Del., 1941, pages 1 and 6.

"Plasticizers and Resins," Monsanto Chemicals (1940), pages 3, 5, 24 and 34.